United States Patent
Long et al.

(10) Patent No.: US 8,602,426 B2
(45) Date of Patent: Dec. 10, 2013

(54) SMALL CART

(75) Inventors: Peter James Maxwell Long, Shanghai (CN); Guangming Su, Shanghai (CN)

(73) Assignee: CHIC Foods Technology Co., Ltd, Shanghai (CN)

( * ) Notice: Subject to any disclaimer, the term of this patent is extended or adjusted under 35 U.S.C. 154(b) by 0 days.

(21) Appl. No.: 13/565,813

(22) Filed: Aug. 3, 2012

(65) Prior Publication Data

US 2013/0038032 A1    Feb. 14, 2013

(30) Foreign Application Priority Data

Aug. 12, 2011 (CN) ...................... 2011 2 0292480 U

(51) Int. Cl.
*B62B 3/00* (2006.01)

(52) U.S. Cl.
USPC ................ 280/47.34; 280/47.35; 280/47.371; 280/33.997

(58) Field of Classification Search
USPC ............... 280/47.34, 47.35, 47.371, 2, 79.11, 280/79.2, 33.991, 33.992, 33.995, 33.996, 280/33.997
See application file for complete search history.

(56) References Cited

U.S. PATENT DOCUMENTS

| | | | | |
|---|---|---|---|---|
| 3,305,117 | A * | 2/1967 | Ford | 414/498 |
| 6,186,728 | B1 * | 2/2001 | Michaud | 414/458 |
| 6,742,790 | B2 * | 6/2004 | Seagraves et al. | 280/47.34 |
| 7,080,844 | B2 * | 7/2006 | Espejo | 280/33.995 |
| 2005/0212233 | A1 * | 9/2005 | Hall | 280/33.991 |
| 2011/0068547 | A1 * | 3/2011 | Mead et al. | 280/33.992 |

* cited by examiner

*Primary Examiner* — John Walters
*Assistant Examiner* — Brian Swenson
(74) *Attorney, Agent, or Firm* — Treasure IP Group

(57) ABSTRACT

A small cart, having a cart body and handle bar, the cart body has an open space with an open rear end. The handle bar is positioned on the back of the cart body, the lower portion of the handle bar is connected to both sides of the cart body through pivots. A top loading plate with surrounding boards is on the top of cart body. A bottom tray with attached wheels is in the bottom space of the cart body. Each lower portion of both sides of the cart body has a pin which extends to the back to the bottom tray. The top loading plate and bottom tray improve the transportation capacity. The top loading plate has a slope for delivering cylindrical shaped materials, its front board can be placed flat for unloading. The handle bar can be used either for pushing or pulling the small car.

5 Claims, 1 Drawing Sheet

SMALL CART

CROSS-REFERENCE TO RELATED APPLICATION

This application claims priority to Chinese Application No. 201120292480.5, filed on Aug. 12, 2011. The Chinese Application is incorporated herein by reference in its entirety.

FIELD OF THE INVENTION

The present invention relates to the field of machinery, in particular to hand operated transportation vehicles, including a non-powered hand-propelled utility cart, specifically a small cart.

BACKGROUND OF THE INVENTION

In the prior art, non-powered hand-propelled carts have been widely used but are not very useful in terms of transporting cylindrically shaped articles. Cylindrically shaped articles can easily fall off such a cart and cannot be transported in large quantities either. Cylindrically shaped articles are usually transported many times back and forth in small quantities, which limits the efficiency of delivery. In terms of heavy articles, uploading and unloading them from the non-powered small carts presents a real difficulty, and it is rather time consuming and labor intensive. In addition, some of the non-powered hand operated small carts are only suitable for being pushed forward. If being pulled forward however, the bottom of the carts can tend to impinge upon the lower leg and feet of the operator, which is not conducive to safe operation.

SUMMARY OF THE INVENTION

The present invention is to disclose a novel small cart. Said small cart solves the above-mentioned problems in the prior art, such as existing cart can only transport small quantities, are not suitable for cylindrically shaped articles and are not convenient to be used when uploading and unloading heavy articles and not suitable for being pulled forward.

The small cart disclosed in the present invention, having a cart body and an inverted U-shaped handle bar, wherein the bottom of said cart body is connected to wheels, inside the cart body is provided an open space and the rear of the cart body is open (not closed), said inverted U-shaped handle bar is disposed on the rear side of the cart body, the two lower portions of the inverted U-shaped handle bar are connected to the bottom portions of both sides of the rear of said cart body with pivots, on the upper portions of both sides of the rear of the cart body are disposed a first set of pins, said first set of pins are inserted into the holes in the middle portion of the inverted U-shaped handle bar, a top loading plate is disposed on the top side of the cart body, the angle between the flat surface of the top loading plate and the horizontal level is greater than zero, the peripheries of the top loading plate are surrounded by boards, the bottom of the front board of the said boards is connected to the top loading plate with a hinge or hinges. The right side and the left side of the front board are connected to the neighboring boards with a second set of pin joints, respectively. A bottom tray is placed in the open space of the cart body. Said bottom tray is on the lower portion of the open space of the cart body. The bottom of the bottom tray is attached to rolling wheels. The rear side of the bottom tray is attached to a second handle bar. A third set of pins reside on the lower portion of the both sides of the rear side of the cart body and said third set of pins are extended to the rear of the bottom tray.

Further, the lower portion of the both sides of the rear of the cart body are placed holes for said third set of pins, said third set of pins are inserted into the holes for said third set of pins.

Further, said third set of pins is magnetic.

Further, the lower portion of each side of the rear of the cart body is backwardly placed with a connection seat, which has a pinhole for receiving the said pivot, and the said pivots are inside the pinholes.

Further, the upper portion of the both sides of the rear of the cart body are backwardly placed joint seats which have pinholes for receiving the said first set of pins, and said first set of pins are inside these pinholes.

The working principle for the present utility cart is as follows. Both the top loading plate and the bottom tray can be used to carry materials. The top loading plate is designed to have a slope. When cylindrical materials on the top plate, they do not roll around during delivery. The front board connecting to the top loading plate can be placed flat, which is more convenient for unloading. When the two middle portions of the inverted U-shaped handle bar are connected to the cart body with the first set of pins, the inverted U-shaped handle bar is secured with the cart body, then the inverted U-shaped handle bar can be used to push the cart forward. When the first set of pins are removed, the inverted U-shaped handle bar is connected to the cart body with the pivots on the bottom portion of the inverted U-shaped handle bar, then there is an adjustable angle between the inverted U-shaped handle bar and cart body and the inverted U-shaped handle bar can be used to pull the cart forward. The bottom tray is confined between cart body and the third set of pins, and can be moved along with the cart body. When the third set of pins are removed, the bottom tray can be moved in and out of the cart body independently.

The advantage of the present utility cart, compared with the carts in the prior art, is prominent. The present invention includes a top loading plate on other top of the cart body, and a bottom tray on the open space of the cart body. The combination of using the top loading plate and bottom tray has improved the transport capacity of the cart. The top loading plate has a slope and its front board can be placed flat, making the cart more appropriate to transport cylindrical shaped materials. The angle between the inverted U-shaped handle bar and cart body can be either flexible or set, so that the cart can be either pulled forward or pushed forward, which provides a safer means for operation.

DETAILED DESCRIPTION OF THE PREFERRED EMBODIMENTS

Embodiment 1

Figure 1:
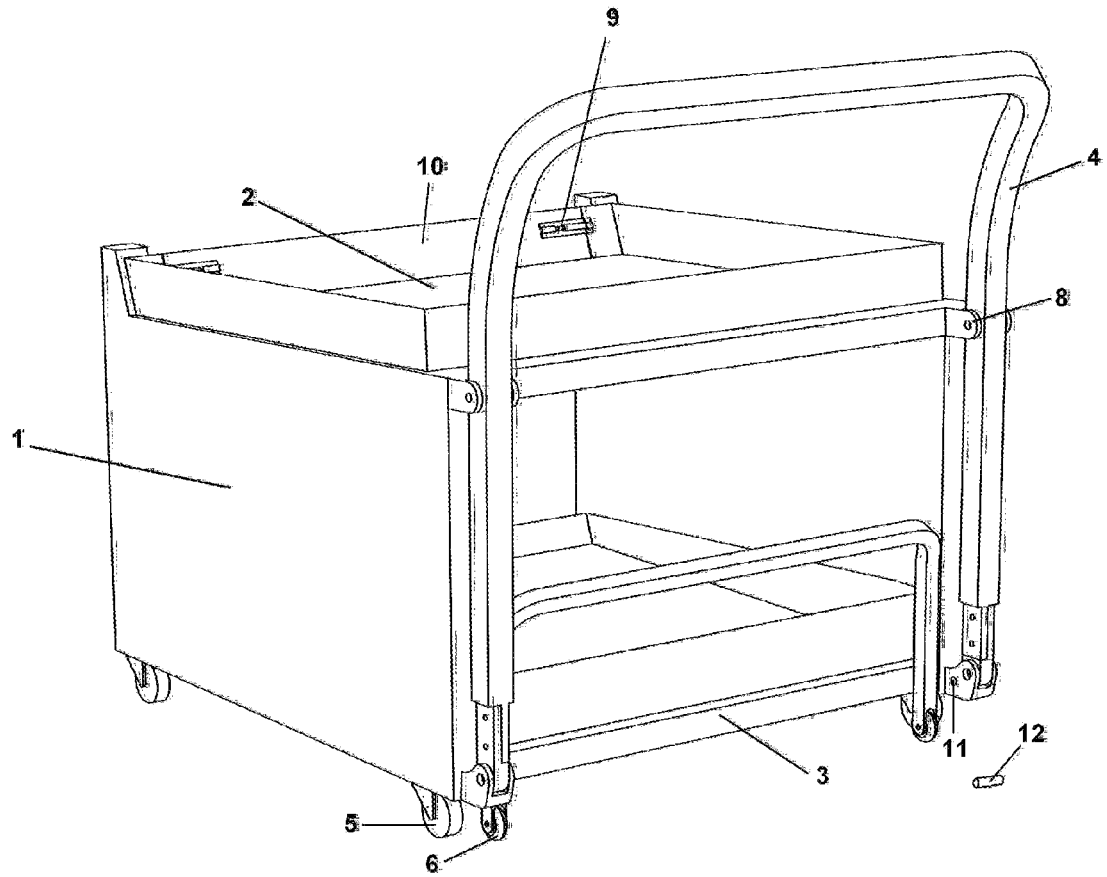
FIG. 1 is a schematic drawing of an exemplary illustration of the small cart in the present invention.
Figure 2:
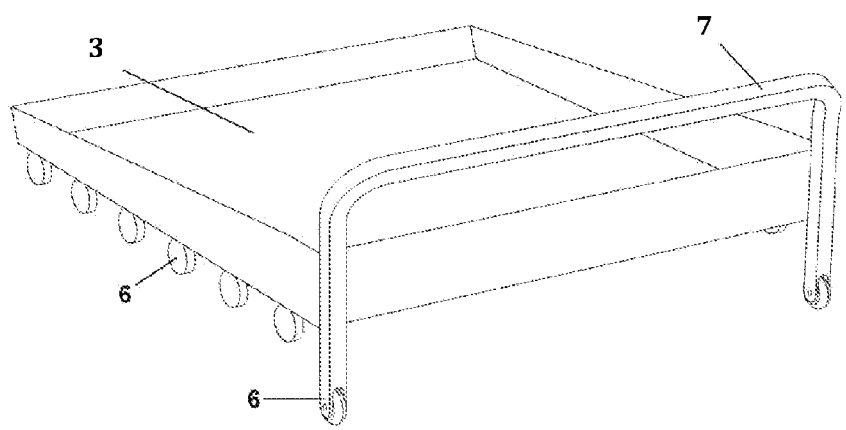
FIG. 2 is a schematic drawing of an exemplary illustration of the bottom tray of the small cart in the present invention.

As illustrated in FIG. 1 and FIG. 2, the small cart disclosed in the present invention, having a cart body 1 and an inverted U-shaped handle bar 4, said cart body 1 is attached to wheels 5 on the bottom, wherein the cart body 1 has an open space, the rear side of the cart body 1 is open, said inverted U-shaped handle bar 4 resides on the rear of the cart body 1, two lower portions of the inverted U-shaped handle bar 4 are connected to the lower portion of the both sides of the rear of the cart body 1 with pivots, top portions of both sides of the rear of the cart body have a first set of pins 8, said first set of pins 8 are inserted into the pin holes in the middle of the inverted U-shaped handle bar 4. On the top of the cart body 1 located a top loading plate 2, the angle between the flat surface of said top loading plate 2 and horizontal plane is great than zero degree. The peripheries of the top loading plate 2 are surrounded by boards. The front board 10 is connected to the top loading plate 2 with a hinge on the bottom. Both sides of the front board 10 are respectively attached to the neighboring boards with a second set of pins 9. Inside the open space of the cart body 1 is a bottom tray 3. Said bottom tray 3 is located in the lower portion of the open space. The bottom of the bottom tray is attached to wheels 6. The rear of the bottom tray 3 is connected to a second handle bar 7. The lower portion of the both sides of the rear of the cart body 1 have a third set of pins 12, said third set of pins 12 extend to the back of the bottom tray 3. In FIG. 1, third set of pins 12 is in an off state.

Further, the bottom of both sides of the cart body 1 pin holes 11, third set of pins 12 is placed inside the third pin holes 11.

Further, said third set of pins 12 is magnetic. When the third set of pins 12 is de-attached, they can be held onto the cart body 1 by magnetic force, preventing the third set of pins 12 from being lost.

Further, the lower portion of each side of the rear of the cart body 1 is backwardly placed with a connection seat, which has a pinhole/pinholes for receiving the said pivot, and the said pivots are inside the pinholes.

Further, the upper portions of the both sides of the rear of the cart body 1 are backwardly placed joint seats which have pinholes for receiving the first set of pins 8, and first set of pins 8 are inside these pinholes.

The working principle of the present embodiment is as follows. The top loading plate 2 and the bottom tray 3 can carry materials separately. The top loading plate 2 has a slope. When cylindrical materials are placed in the top loading plate 2, during delivery, the cylindrical material will not roll around. The front board 10 of the top loading plate 2 can be placed flat and make it more convenient for unloading. When the inverted U-shaped handle bar 4 is connected to the cart body 1 with first set of pins 8 in the middle, inverted U-shaped handle bar 4 is secured with the cart body 1 and can be used for pushing the cart. When the first set of pins 8 are de-attached, the inverted U-shaped handle bar 4 is connected to the cart body 1 with pivots on the lower portion, the angle between the inverted U-shaped handle bar 4 and cart body 1 is flexible and the inverted U-shaped handle bar can be used for pulling the cart body 1. The bottom tray 3 is confined between cart body 1 and third set of pins 12 and can be moved along with the cart body 1. When third set of pins 12 are de-attached and the inverted U-shaped handle bar 4 is placed flat, the bottom tray 3 can move in and out of the cart body 1 separately.

We claim:

1. A small cart, having a cart body and an inverted U-shaped handle bar, said cart body having wheels attached to its bottom, wherein said cart body has an open space, the rear of the cart body is open, said inverted U-shaped handle bar is located on the back of the cart body, the lower portion of the inverted U-shaped handle bar is connected to the lower portion of the both sides of the rear of the cart body with pivots, the upper portion of the both sides of the rear of the cart body have a first set of pins, said first set of pins are in the pin holes in the middle of the inverted U-shaped handle bar, the top of the cart body has a top loading plate, the angle between the flat surface of the top loading plate and horizontal plane is greater than zero degree, the peripheries of top loading plate have surrounding boards, the front board of the surrounding boards of the top loading plate is connected to the top loading plate with a hinge on the bottom, both sides of the front board are connected to the neighboring boards with a second set of pins, a bottom tray is located in the open space in the cart body, said bottom tray is on the bottom portion of the open space, the bottom of the bottom tray is attached to rolling wheels, the rear of the bottom tray has a second handle bar, the lower portions of the both sides of the rear of the cart body have a third set of pins, said third set of pins extend to the back of the bottom tray.

2. The small cart of claim 1, wherein the lower portions of the both sides of the rear of the cart body have pin holes, said third set of pins are inside the pin holes.

3. The small cart of claim 1, wherein the third set of pins is magnetic.

4. The small cart of claim 1, wherein each lower portion of the both sides of the rear of the cart body is placed with a connection seat, a pin hole which receives the said pivot is inside the connection seat, and the said pivot is inside the pin hole of said connection seat.

5. The small cart of claim 1, wherein each upper portion of the both sides of the rear of the cart body backwardly is placed a joint seat, which has a pin hole for receiving a pin of said first set of pins and the pin of said first set of pins is inside the pin hole of the said joint seat.

\* \* \* \* \*